United States Patent
Goetz et al.

(10) Patent No.: US 10,940,804 B2
(45) Date of Patent: Mar. 9, 2021

(54) STOWAGE SYSTEM FOR STOWING A TWO-WHEELED VEHICLE IN A MOTOR VEHICLE

(71) Applicant: Dr. Ing. h.c. F. Porsche Aktiengesellschaft, Stuttgart (DE)

(72) Inventors: Erwin Goetz, Weil Der Stadt (DE); Jasmin Ostertag, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/257,127

(22) Filed: Jan. 25, 2019

(65) Prior Publication Data

US 2019/0225162 A1 Jul. 25, 2019

(30) Foreign Application Priority Data

Jan. 25, 2018 (DE) .................... 10 2018 101 678.6

(51) Int. Cl.
*B60P 7/08* (2006.01)
*B60R 9/06* (2006.01)
(Continued)

(52) U.S. Cl.
CPC ............... *B60R 9/06* (2013.01); *B60P 1/02* (2013.01); *B60P 3/06* (2013.01); *B60P 3/07* (2013.01);
(Continued)

(58) Field of Classification Search
CPC .. B60R 9/06; B60R 5/00; B60R 9/065; B60R 9/08; B60R 11/00; B60R 5/04;
(Continued)

(56) References Cited

U.S. PATENT DOCUMENTS

| 4,578,854 A | 3/1986 | McFarland |
| 5,301,992 A | 4/1994 | Whitmore |

(Continued)

FOREIGN PATENT DOCUMENTS

| DE | 10 2008 010 392 | 8/2009 |
| DE | 10 2015 110 730 | 1/2016 |

(Continued)

OTHER PUBLICATIONS

German Search Report dated Aug. 24, 2018.
Korean Examination Report dated Feb. 11, 2020.
French Search Report dated Sep. 17, 2020.

*Primary Examiner* — Stephen T Gordon
(74) *Attorney, Agent, or Firm* — Gerald E. Hespos; Michael J. Porco; Matthew T. Hespos (57) ABSTRACT

A stowage system (14) is provided for stowing a two-wheeled vehicle (30) in a motor vehicle (12), having a loading floor (16) for depositing the two-wheeled vehicle (30), and a lifting device (20) which can be supported on a load-bearing structure (22) of the motor vehicle (12) for moving the loading floor (16) between a loading position and a stowing position. The loading floor (16) has at least one three-dimensionally shaped first centring means (26) for positioning the two-wheeled vehicle (30) at least in a first coordinate direction relative to the loading floor (16). A two-wheeled vehicle (30) can be stowed in a space-saving manner and protected against damage by of the loading floor (16) which can be lowered and the at least one centring means (26).

10 Claims, 6 Drawing Sheets

(51) Int. Cl.
| | |
|---|---|
| *B60R 5/04* | (2006.01) |
| *B60R 9/10* | (2006.01) |
| *B60P 3/07* | (2006.01) |
| *B62H 3/08* | (2006.01) |
| *B60P 3/075* | (2006.01) |
| *B60P 3/06* | (2006.01) |
| *B60P 3/08* | (2006.01) |
| *B60P 3/077* | (2006.01) |
| *B60P 3/073* | (2006.01) |
| *B60R 5/00* | (2006.01) |
| *B60R 9/08* | (2006.01) |
| *B60P 1/02* | (2006.01) |
| *B60R 11/00* | (2006.01) |

(52) U.S. Cl.
CPC ............... *B60P 3/073* (2013.01); *B60P 3/075* (2013.01); *B60P 3/077* (2013.01); *B60P 3/08* (2013.01); *B60R 5/00* (2013.01); *B60R 5/04* (2013.01); *B60R 9/065* (2013.01); *B60R 9/08* (2013.01); *B60R 9/10* (2013.01); *B60R 11/00* (2013.01); *B62H 3/08* (2013.01); *B60R 2011/0036* (2013.01)

(58) Field of Classification Search
CPC ............... B60R 9/10; B60R 2011/0036; B60R 2011/008; B60P 3/07; B60P 3/075; B60P 3/06; B60P 3/08; B60P 3/077; B60P 3/073; B60P 1/02; B62H 3/08
USPC .......... 410/8, 16, 17, 19, 24, 25, 26, 27, 29, 410/29.1, 30
See application file for complete search history.

(56) References Cited

U.S. PATENT DOCUMENTS

| | | | |
|---|---|---|---|
| 9,707,880 B2 * | 7/2017 | Ochenkowski | B60P 1/4442 |
| 10,124,852 B2 | 11/2018 | Potticary et al. | |
| 2003/0070855 A1 * | 4/2003 | Horii | B60P 3/125 |
| | | | 180/208 |
| 2009/0091155 A1 * | 4/2009 | Rawlings | B60J 1/1823 |
| | | | 296/107.07 |
| 2016/0023586 A1 | 1/2016 | Potticary et al. | |

FOREIGN PATENT DOCUMENTS

| | | |
|---|---|---|
| DE | 10 2014 226 461 | 6/2016 |
| JP | 2002-172971 | 6/2002 |
| JP | 2007-083970 | 4/2007 |

* cited by examiner

STOWAGE SYSTEM FOR STOWING A TWO-WHEELED VEHICLE IN A MOTOR VEHICLE

CROSS REFERENCE TO RELATED APPLICATION

This application claims priority under 35 USC 119 to German Patent Appl. No. 10 2018 101 678.6 filed on Jan. 25, 2018, the entire disclosure of which is incorporated herein by reference.

BACKGROUND

Field of the Invention

The invention relates to a stowage system, with the aid of which a two-wheeled vehicle can be stowed in a motor vehicle.

Related Art

DE 10 2015 110 730 A1 has disclosed a stowage system for a motor vehicle, in the case of which stowage system an arm which is attached pivotably in a boot of the motor vehicle can be fastened to a saddle tube of a two-wheeled vehicle, in order to pivot the two-wheeled vehicle into the boot.

There is a constant need to simplify the stowing of objects in a motor vehicle.

It is the object of the invention to indicate measures which makes simple stowing of objects in a motor vehicle possible.

SUMMARY

According to the invention, a stowage system for stowing a two-wheeled vehicle in a motor vehicle is provided, having a loading floor for depositing the two-wheeled vehicle, and a lifting device that can be supported on a load-bearing structure of the motor vehicle for moving the loading floor between a loading position and a stowing position. The loading floor has at least one three-dimensionally shaped first centering means for the positionally accurate positioning of the two-wheeled vehicle at least in a first coordinate direction relative to the loading floor.

The two-wheeled vehicle can be deposited on the loading floor, and the loading floor can be lowered with the aid of the lifting device. As a result, the two-wheeled vehicle can be lowered within the motor vehicle. The two-wheeled vehicle can be folded to define a comparatively narrow and slim structure and that be received in a space-saving manner in a previously known and previously defined volume. To this end, it is not necessary to provide a particularly large-volume boot in the motor vehicle. Instead, a receiving space that is particularly narrow in the driving direction, extends over the typical width of a boot. Thus, the receiving space can be slot-shaped, and can extend from a boot floor towards the bottom. The two-wheeled vehicle can be received reliably laterally between longitudinal carriers of the load-bearing structure and crossmembers or a bumper, and can even be protected against damage in the case of a crash. At the same time, the two-wheeled vehicle can be kept out of the remaining boot, with the result that sufficient storage space for further objects is still available. The centering means can ensure that the two-wheeled vehicle assumes a defined relative position with respect to the loading floor. As a result contact of the two-wheeled vehicle with an installed part of the motor vehicle can be avoided during lowering of the loading floor. The loading floor that can be lowered and the at least one centering means enables a two-wheeled vehicle to be stowed in a manner that is space-saving and protected against damage, thereby enabling simple stowing of objects in a motor vehicle.

A first centering means can be configured as a groove for the lateral centring of at least one wheel of the two-wheeled vehicle. As a result, in a folded state, the two-wheeled vehicle can be inserted upright into the depression that is configured by way of the groove. The edges of the groove can bear laterally against the edges of the two-wheeled vehicle so that the two-wheeled vehicle is centred in a coordinate direction that corresponds to the longitudinal direction of the motor vehicle. The loading floor may have further centring means that bears against the front side and/or against the rear side of the wheels of the two-wheeled vehicle. As a result, the two-wheeled vehicle also is received in the loading floor in a manner that is centred in a coordinate direction corresponding to the transverse direction of the motor vehicle.

A stationary support floor may be provided, and the loading floor can be moved relative to the support floor by the lifting device. The support floor may have at least one second centring means for accurate positioning of a wheel of the two-wheeled vehicle relative to the support floor at least in a second coordinate direction that is different from the first coordinate direction. The second centring means may be guided in the stowing position of the loading floor through a through opening of the loading floor. The through opening may be provided in the first centring means. The support floor is connected to the load-bearing structure of the motor vehicle. For example, the support floor may be configured by way of a floor panel of the motor vehicle. The second centring means can be configured, for example, as a ramp that can bear against the front side and/or against the rear side of the wheels of the two-wheeled vehicle. Thus, the two-wheeled vehicle can be centred in a coordinate direction that corresponds to the transverse direction of the motor vehicle. As a result of the relative movement of the loading floor with respect to the support floor and therefore also relative to the second centring means, the two-wheeled vehicle can be oriented and centred automatically by the second centring means in the case of the movement of the loading floor from the loading position into the stowing position. The through openings in the loading floor can already make rough centring of the wheels of the two-wheeled vehicle and/or centring of the loading floor on the second centring means possible. The second centring means may be connected to the load-bearing structure, by, for example, a rear side of a ramp-shaped or wedge-shaped second centring means being fastened to a side face of a longitudinal carrier of the load-bearing structure. As a result, the support floor can be centred on the load-bearing structure and/or can be additionally reinforced via the second centring means.

A stationary charging plug may be fastened to the support floor for charging a chargeable battery of the two-wheeled vehicle. The charging plug can be guided, in the stowing position of the loading floor, through a charging opening of the loading floor. The charging plug may be configured to be plugged automatically into a plug receptacle of the two-wheeled vehicle as the two-wheeled vehicle is moved into the stowing position, thereby connecting the battery of the two-wheeled vehicle to a vehicle-mounted electrical system of the motor vehicle and charging it automatically and/or selectively. As a result of the centring of the two-wheeled vehicle on the loading floor, the two-wheeled vehicle can assume a defined predictable relative position with respect to the charging plug, at least when the stowing position is reached. As a result, it is possible that a plug receptacle of the two-wheeled vehicle that is connected to the battery of the two-wheeled vehicle also is positioned in a predictable relative position with respect to the charging plug. Therefore, the charging plug can be plugged automatically into the plug receptacle of the two-wheeled vehicle in the case of the movement of the two-wheeled vehicle into the stowing position. Accordingly, the battery of the two-wheeled vehicle is connected to the vehicle-mounted electrical system of the motor vehicle and can be charged automatically and/or selectively. The electric components of the two-wheeled vehicle are protected as a result against damage by further objects that are deposited in the boot.

A covering, such as a pivotable covering, may be provided for covering an upper side of the two-wheeled vehicle. The covering may have a planar panel for providing a depositing floor and/or a hood that also covers the two-wheeled vehicle laterally. As a result, the two-wheeled vehicle that is lowered in the stowing position can be separated from the remaining boot of the motor vehicle so that further objects deposited in the boot cannot reach the two-wheeled vehicle. At the same time, the side of the covering that faces away from the two-wheeled vehicle can be used for depositing objects.

A boot floor may be provided for depositing objects, and the covering may be arranged with a surface substantially flush with respect to the boot floor in a covering position in which it covers the loading floor. The covering may be articulated pivotably on the boot floor. In the covering position of the covering, the upper side of the covering that faces away from the two-wheeled vehicle can cooperate with the boot floor to define a depositing surface that lies in a common plane. Thus, a correspondingly larger object can be deposited at the same time on the covering and the boot floor without an offset between the covering and the boot floor.

The lifting system may have at least one damping spring for providing a spring force to press the loading floor in the direction of the loading position. If no two-wheeled vehicle is deposited on the loading floor, the damping spring can overcome the weight of the loading floor and can press it at least into the vicinity of the loading position. Thus, depositing the two-wheeled vehicle on the loading floor can be simplified. If the weight of the two-wheeled vehicle is acting on the loading floor, the loading floor can be lowered down toward the stowing position counter to the spring force of the damping spring. Accordingly, the damping spring avoids a sudden falling down of the loading floor and the two-wheeled vehicle. The risk of damage of the two-wheeled vehicle during loading and/or unloading can be reduced as a result.

The lifting system may have a drive. The drive can be a scissor arrangement, a spindle or the like. As a result, the loading floor can be moved in a substantially plane-parallel manner and comparably to a lifting platform. The lifting system can be driven, for example, with the aid of an electric motor for lifting and lowering to move the loading floor from the stowing position into the loading position and/or from the loading position into the stowing position. In addition, the loading floor can be fixed in the loading position and/or from the loading position or further intermediate positions. The electric motor can provide a braking torque to avoid excessively rapid lowering of the loading floor due to gravity.

The loading floor may be part of a loading tub for covering at least a large part of the height of the two-wheeled vehicle. Lateral falling out or tilting over of the two-wheeled vehicle can be avoided as a result. In addition, it is possible to trim the loading tub at least partially on its inner faces with a damping material, for example foam to avoid rattling of the two-wheeled vehicle in the loading tub and to fix the two-wheeled vehicle in a defined relative position. The loading floor and/or the loading tub may be connected releasably to the lifting device. As a result, the two-wheeled vehicle can already be loaded into the loading tub outside the motor vehicle and can be inserted into the motor vehicle together with the loading tub. In addition, the loading tub can collect dirt that falls from the two-wheeled vehicle and can be removed easily again in a state where the loading tub is separated from the lifting device.

A locking apparatus may be provided for locking the loading floor in the loading position and/or in the stowing position. Descending of the loading floor during loading of the two-wheeled vehicle can be avoided as a result. In addition, the loading floor can be fixed in terms of movement in the stowing position to avoid rattling noise.

In the following text, the invention will be described by way of example using an embodiment with reference to the appended drawings, it being possible for the features which are described in the following text to represent one aspect of the invention both in each case individually and in combination.

DETAILED DESCRIPTION

Figure 1:
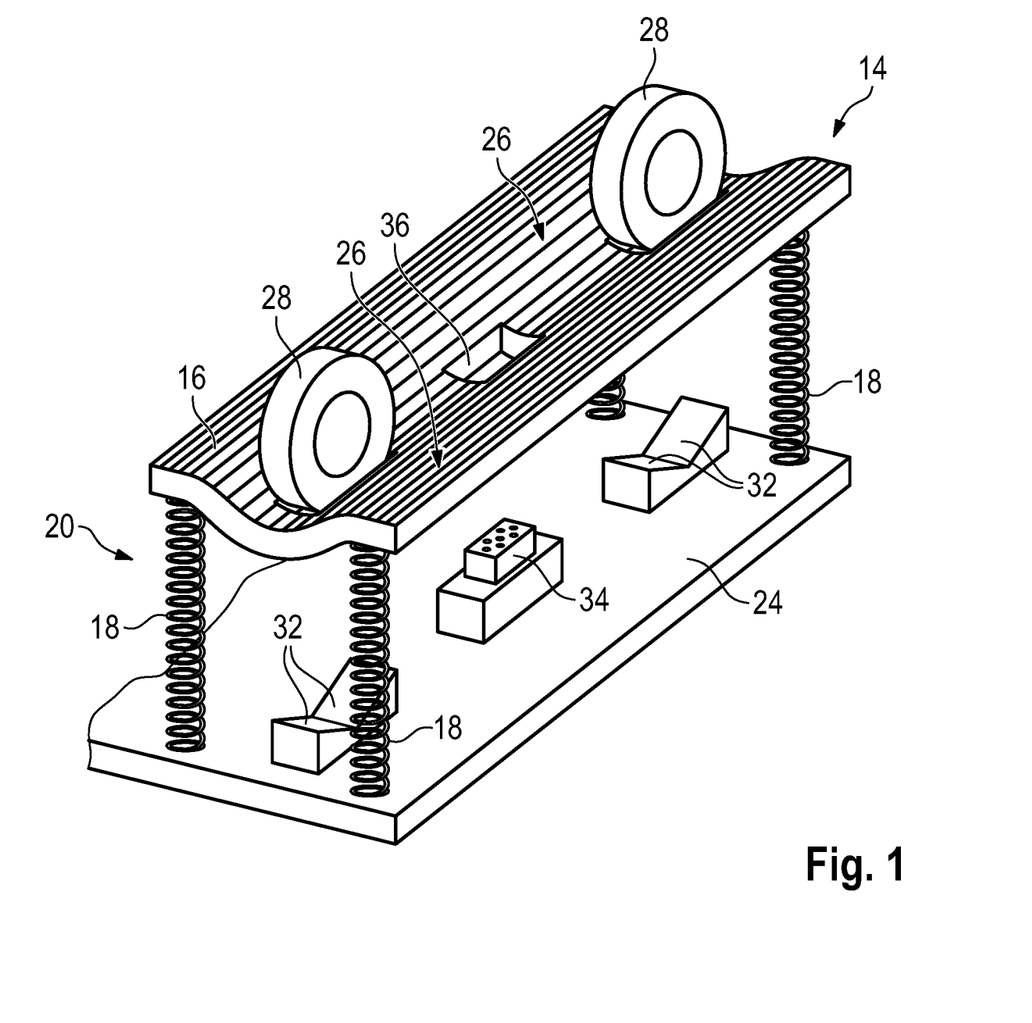
FIG. 1 shows a diagrammatic perspective simplified outline illustration of a stowage system.
Figure 2:
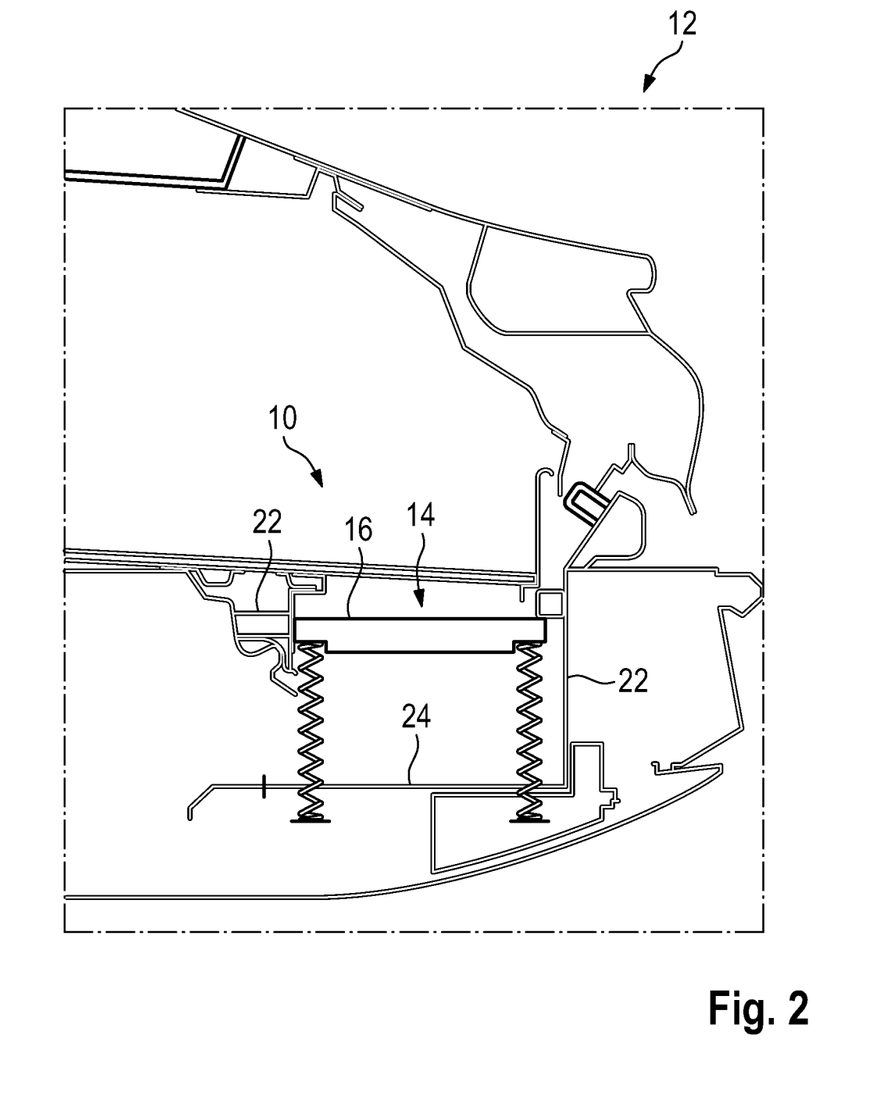
FIG. 2 shows a diagrammatic lateral sectional view of a boot of a motor vehicle having the stowage system from FIG. 1 in a loading position.

A stowage system 14 is shown in FIG. 1 and FIG. 2 for a boot 10 of a motor vehicle 12 that has a loading floor 16. The stowage system 14 can be moved in the vertical direction relative to a support floor 24 that is connected fixedly to a load-bearing structure 22 of the motor vehicle 12. The movement of the stowage system 14 is via a lifting device 20 that has damping springs 18. The loading floor 16 has a groove-shaped configuration. The groove shape forms a first centring means 26 configured to bear laterally against wheels 28 of a two-wheeled vehicle 30 and to center the two-wheeled vehicle 30 on the loading floor 16 in a coordinate direction that corresponds to the longitudinal direction of the motor vehicle 12. The loading floor 16 can be lowered from the loading position, which is shown in FIG.

1, into a stowing position, in which the loading floor 16 is arranged adjacent to the support floor 24. For example, ramp-shaped second centring means 32 are fastened to the support floor 24. The second centring means 32 can penetrate through through openings of the loading floor 16 in the stowing position of the loading floor 16 to bear against a front side and/or rear side of the wheels 28 of the two-wheeled vehicle 30. As a result, the two-wheeled vehicle 30 is centred in a coordinate direction that corresponds to the transverse direction of the motor vehicle 12. On the basis of the centring, a charging plug 34, which is connected to the support floor 24, can be guided through a charging opening 36 of the loading floor 16 during lowering of the loading floor 16 and can be connected automatically to the two-wheeled vehicle 30 to charge a chargeable battery of the two-wheeled vehicle 30 via the vehicle-mounted electrical system of the motor vehicle. The electric contact is disconnected automatically if the loading floor 16 is raised into the loading position by the lifting device 20 for unloading the two-wheeled vehicle.

Figure 3:
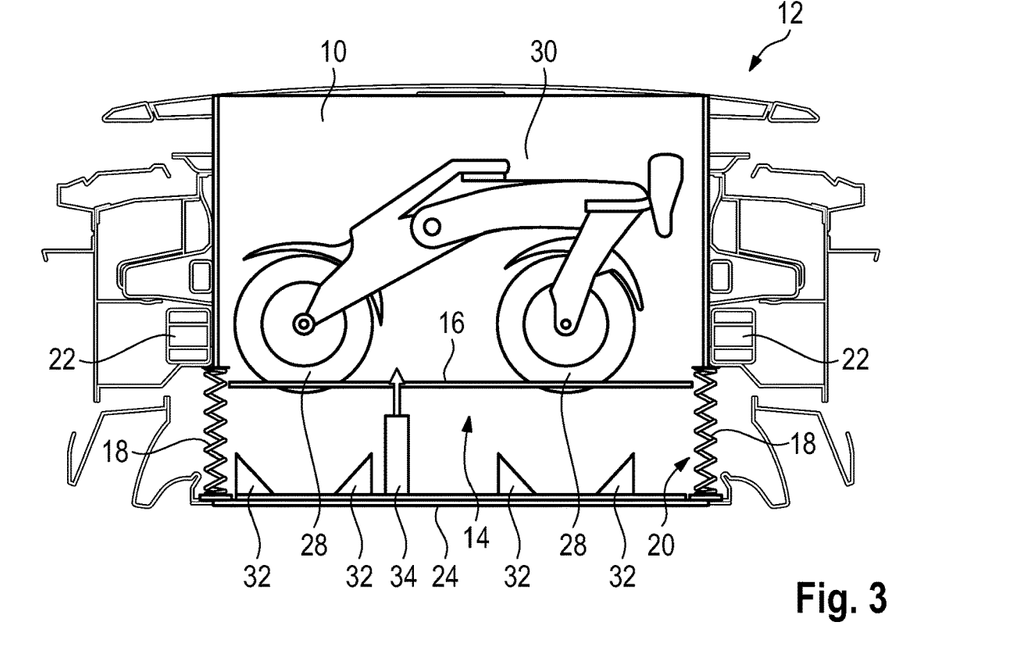
FIG. 3 shows a diagrammatic sectional rear view of the motor vehicle from FIG. 2 having a two-wheeled vehicle which is loaded in it.
Figure 4:
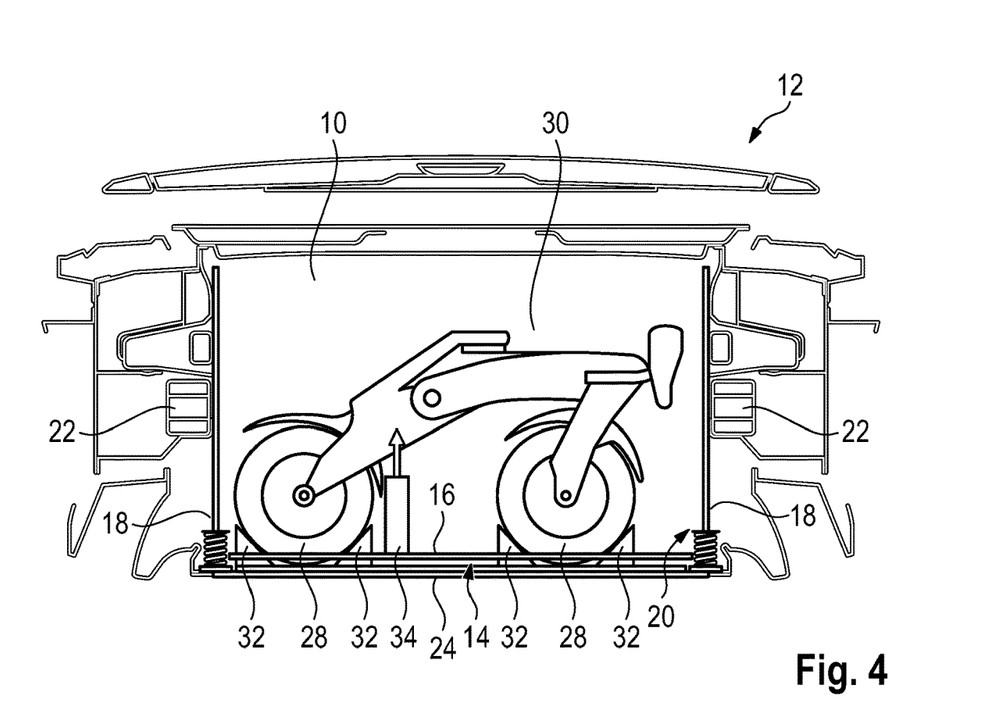
FIG. 4 shows a diagrammatic sectional rear view of the motor vehicle from FIG. 3 in a stowing position of the stowage system.

As shown in FIG. 3, the loading floor 16 can be positioned in the loading position at a height such that the two-wheeled vehicle 30, which is folded together, can be deposited upright on the loading floor 16 by way of a relative movement in the longitudinal direction of the motor vehicle 12. If the loading floor 16 is lowered counter to the spring force of the damping spring 18 (as shown in FIG. 4), the two-wheeled vehicle 30 can be oriented automatically onto the second centring means 32 in the transverse direction of the motor vehicle 12 so that the charging plug 34 can be connected to the two-wheeled vehicle 30.

Figure 5:
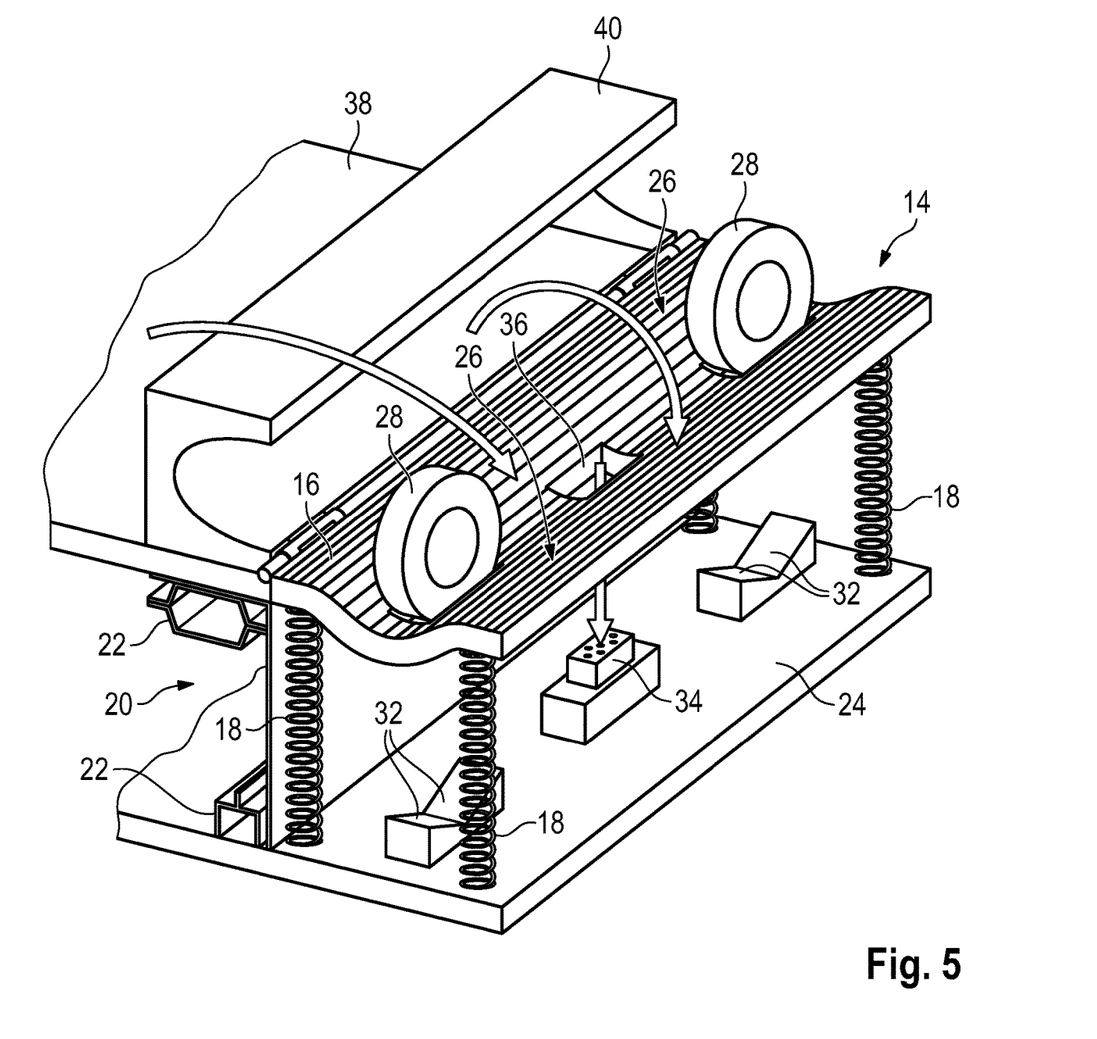
FIG. 5 shows a diagrammatic perspective simplified outline illustration of the motor vehicle from FIG. 3.
Figure 6:
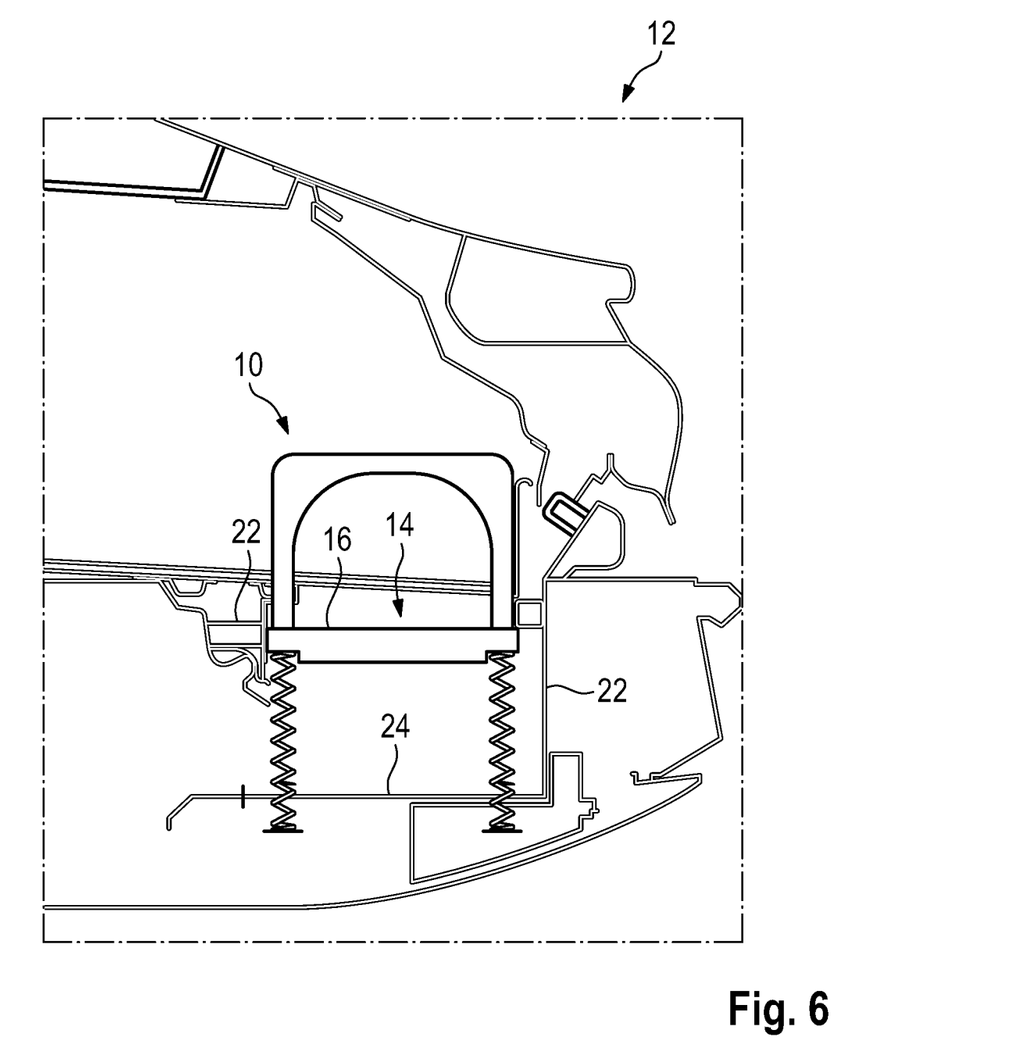
FIG. 6 shows a diagrammatic lateral sectional view of the motor vehicle from FIG. 5 having the stowage system in the case of a stowed two-wheeled vehicle.
Figure 7:
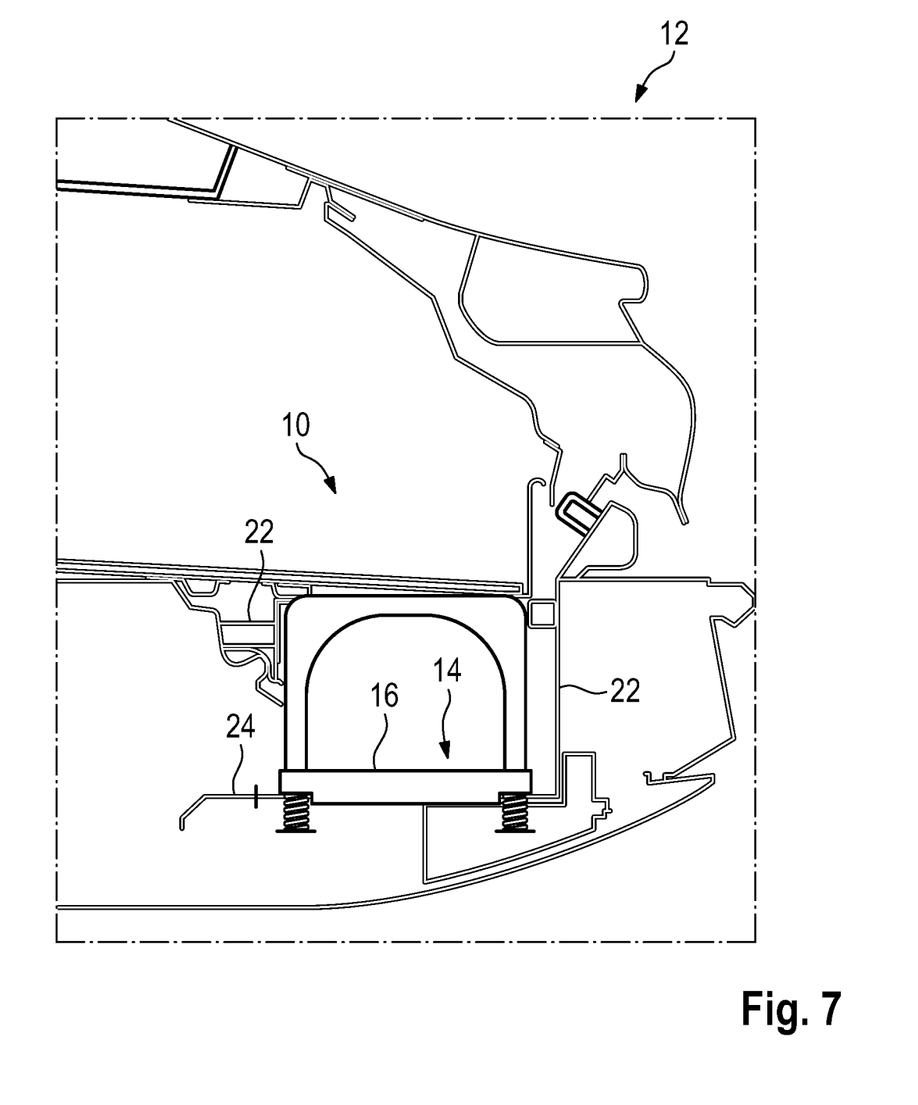
FIG. 7 shows a diagrammatic lateral sectional view of the motor vehicle from FIG. 5 having the stowage system without a stowed two-wheeled vehicle.

As shown in FIG. 5, a hood-shaped or panel-shaped covering 40 can be articulated pivotably to a boot floor 38 or to the loading floor 16 of the boot 10. The covering 40 can cover the two-wheeled vehicle 30 in the stowing position (FIG. 6) and, in the closed state in the covering position, forms a depositing surface that lies in a common plane together with the boot floor 38 (FIG. 7).

What is claimed is:

1. A stowage system for stowing a two-wheeled vehicle in a motor vehicle, comprising:
    a stationary support floor;
    a loading floor for depositing the two-wheeled vehicle, the loading floor having at least one three-dimensionally shaped first centering means for positionally accurate lateral centering of at least one wheel of the two-wheeled vehicle at least in a first coordinate direction relative to the loading floor;
    a lifting device that can be supported on a load-bearing structure of the motor vehicle for moving the loading floor relative to the support floor between a loading position and a stowing position; and
    at least one second centering means for positioning at least one wheel of the two-wheeled vehicle relative to the support floor at least in a second coordinate direction that is different from the first coordinate direction, the second centering means being guided, in the stowing position of the loading floor, through a through opening in the first centering means of the loading floor as the loading floor is moved to the stowing position.

2. The stowage system of claim 1, wherein the first centering means is a groove for the lateral centering of at least one wheel of the two-wheeled vehicle.

3. A stowage system for stowing a two-wheeled vehicle in a motor vehicle, comprising:
    a stationary support floor;
    a loading floor for depositing the two-wheeled vehicle, the loading floor having at least one three-dimensionally shaped first centering means for positionally accurate lateral centering of at least one wheel of the two-wheeled vehicle at least in a first coordinate direction relative to the loading floor;
    a lifting device that can be supported on a load-bearing structure of the motor vehicle for moving the loading floor relative to the support floor between a loading position and a stowing position; and
    a stationary charging plug fastened to the support floor and configured for charging a chargeable battery of the two-wheeled vehicle, the charging plug being guided, in the stowing position of the loading floor, through a charging opening of the loading floor, the charging plug being configured to be plugged automatically into a plug receptacle of the two-wheeled vehicle during movement of the two-wheeled vehicle into the stowing position to connect the battery of the two-wheeled vehicle to a vehicle-mounted electrical system of the motor vehicle and to charge the battery of the two-wheeled vehicle automatically and/or selectively.

4. The stowage system of claim 3, further comprising the loading floor being movable relative to the support floor by the lifting device, the support floor having at least one second centering means for positioning at least a wheel of the two-wheeled vehicle relative to the support floor at least in a second coordinate direction that is different from the first coordinate direction, the second centering means being guided, in the stowing position of the loading floor, through a through opening of the loading floor, the through opening being provided in the first centering means.

5. A stowage system for stowing a two-wheeled vehicle in a motor vehicle, comprising:
    a loading floor for depositing the two-wheeled vehicle, the loading floor having at least one three-dimensionally shaped first centering means for positionally accurate positioning of the two-wheeled vehicle at least in a first coordinate direction relative to the loading floor;
    a lifting device that can be supported on a load-bearing structure of the motor vehicle for moving the loading floor between a loading position and a stowing position,
    a pivotable covering for covering an upper side of the two-wheeled vehicle, the covering having a planar panel for providing a depositing floor and/or a hood that also covers the two-wheeled vehicle laterally.

6. The stowage system of claim 5, further comprising a boot floor for depositing objects, the covering being arranged substantially with a flush surface with respect to the boot floor in a covering position, in which the covering covers the loading floor, the covering being articulated pivotably on the boot floor.

7. The stowage system of claim 1, wherein the lifting device has at least one damping spring for providing a spring force to press the loading floor in the direction of the loading position.

8. The stowage system of claim 1, wherein the lifting device has a drive.

9. The stowage system of claim 1, wherein the loading floor is part of a loading tub for covering at least a part of the height of the two-wheeled vehicle.

10. The stowage system of claim 1, further comprising a locking apparatus for locking the loading floor in the loading position and/or in the stowing position.

* * * * *